United States Patent [19]
Nabeta et al.

[11] 4,338,378
[45] Jul. 6, 1982

[54] FILM FOR HEAT SEALING AND PROCESS OF HEAT SEALING

[75] Inventors: Takeshi Nabeta; Takeshi Masui; Tsuguo Hasegawa, all of Machida, Japan

[73] Assignee: Denki Kagaku Kogyo Kabushiki Kaisha, Tokyo, Japan

[21] Appl. No.: 289,091

[22] Filed: Jul. 31, 1981

Related U.S. Application Data

[62] Division of Ser. No. 946,724, Sep. 28, 1978, Pat. No. 4,302,554.

[30] Foreign Application Priority Data

Jun. 29, 1978 [JP] Japan ................................. 53-78058

[51] Int. Cl.$^3$ ............................................. B32B 15/08
[52] U.S. Cl. ................................................. 428/462
[58] Field of Search ................... 428/462, 513; 525/71, 525/89, 98

[56] References Cited
U.S. PATENT DOCUMENTS 3,562,356 2/1971 Nyberg ............................. 260/876
3,678,134 7/1972 Middlebrook ................. 260/876 B
4,091,134 5/1978 Uemura ............................. 428/462

Primary Examiner—Paul R. Michl
Attorney, Agent, or Firm—Stevens, Davis, Miller & Mosher

[57] ABSTRACT

A film and a laminate using the film as a substrate which both are suitable for heat sealing and a process for heat sealing the film and the laminate are disclosed. The film comprises a blend of (I) at least one member selected from the group consisting of (A) elastomeric block copolymers of vinyl-aromatic compounds with conjugated diene compounds, (B) resinous block copolymers of vinyl-aromatic compounds with conjugated diene compounds and (C) vinyl-aromatic resins and/or modified vinyl-aromatic resins, and (II) an olefinic polymer.

11 Claims, No Drawings

FILM FOR HEAT SEALING AND PROCESS OF HEAT SEALING

This is a division of application Ser. No. 946,724 filed Sept. 28, 1978, now U.S. Pat. No. 4,302,554.

BACKGROUND OF THE INVENTION

This invention relates to a film useful as a heat sealing material, a heat-sealing laminate using the film as a substrate thereof and a process for heat sealing the film and the laminate to a plastic container.

Generally, in plastic containers which are widely used for seal packing foodstuffs such as dairly products and confections, there have chiefly been used covers made of aluminum foil. When plastic containers are sealed with covers of aluminum foil, the covers are generally bonded to the containers with a hot-melt type adhesive or solvent type adhesive. In the container using such an adhesive when the cover is removed from the container, the adhesive remains on the container. The adhesive thus left on the container is not desirable hygienically in the least and is possible to do harm to the human body. On the other hand, a process for heat sealing such plastic containers with a plastic film has also been widely known. In this case, the problem ascribable to use of an adhesive is not entailed. But, since the sealing is made between two similar materials, the seal thus formed certainly has ample strength and, for this reason, suffers from a disadvantage that desired peeling of the cover from the container becomes difficult to the extent of making the container opening quite inconvenient. For this process, therefore, the requirements that the peeling of the cover from the container should be easy (easy seal peeling) and that the cover provides high heat sealing property must be satisfied simultaneously.

To satisfy these contradictory requirements, proper selection of a film as the sealing material and proper selection of conditions for heat sealing are necessary.

The expression "easy seal peeling" as used in this invention means the property of a sealed container that in a normal state, the container remains in a tightly sealed state and, when the cover is peeled from the container, the cover can easily be removed by hand without any breakage to the cover or the container proper, and the expression "normal state" means the state in which the sealed container is transported or otherwise handled in the distribution channel.

SUMMARY OF THE INVENTION

An object of this invention is to provide a film suitable for application to plastic containers by heat sealing.

Another object of this invention is to provide a laminate suitable for application to plastic containers by heat sealing.

Still another object of this invention is to provide a process for heat sealing plastic containers in such a manner as to satisfy easy peeling of seal and high heat-sealing property at the same time.

Further, the objects of this invention will become apparent from a description to be given in detail herein below.

DETAILED DESCRIPTION OF THE INVENTION

To accomplish the objects described above according to the present invention, there are provided a film comprising a blend of (I) at least one member selected from the group consisting of (A) elastomeric block copolymers of vinyl-aromatic compounds with conjugated diene compounds, (B) resinous block copolymers of vinyl-aromatic compounds with conjugated diene compounds and (C) vinyl-aromatic resins and/or modified vinyl-aromatic resins, and (II) an olefinic polymer; a laminate using the film as a substrate thereof; and a process for applying the film and the laminate to plastic containers by heat sealing.

In the present invention, the objects of the invention can be accomplished by using the olefinic polymer and the other component in respective amounts which give a proper composition ratio. No matter what composition ratio may be used, the proportion of the olefinic polymer in the whole composition is desired to fall in the range of from 2.5 to 50% by weight. Where the composition is composed of three or more components, the elastomeric block copolymer is desired to account for not more than 50% by weight, the resinous block copolymer for not more than 70% by weight and the vinyl-aromatic resin and/or modified vinyl-aromatic resin for not more than 90% by weight, respectively, for all the components coexisting with the olefinic polymer in the composition.

The composition ratio of the components used in the composition should be selected to suit the particular purpose for which the composition is intended.

In the present invention, styrene or α-methyl styrene is used as the vinyl-aromatic compound and butadiene, isoprene or piperylene is used as the conjugate diene compound. As the vinyl-aromatic resin, there is used polystyrene. Examples of modified vinyl-aromatic resins which are used in the present invention include styrene-butadiene graft copolymers, styrene-methyl methacrylate-butadiene copolymers, styrene-acrylonitrile copolymers, and styrene-acrylonitrile-butadiene copolymers.

As the olefinic polymer, there is used at least one member selected from the group consisting of ethylene-α-olefin random copolymers, ethylene-vinyl acetate copolymers, ethylene-alkyl acrylate copolymers, propylene polymers, and ethylene-propylene elastomers containing a small amount of unsaturated compounds having a double bond. Particularly disirable olefinic polymers for this invention are ethylene-α-olefin random copolymers, ethylene-alkyl acrylate copolymers and ethylene-vinyl acetate copolymers.

Examples of α-olefins to copolymerize with ethylene to form ethylene-α-olefin random copolymers are propylene, butene, pentene and hexene. Of the various copolymers using such α-olefins, the copolymer with butene-(1) is preferable for the purpose of this invention. Examples of the alkyl radicals in the ethylene-alkyl acrylate copolymers used in this invention include ethyl, propyl, iso-propyl and butyl. Of these alkyl radicals, ethyl radical is particularly desirable. The alkyl acrylate content of this copolymer is desired to fall in the range of from 5 to 35% by weight. For the ethylene-vinyl acetate copolymer to be used advantageously for this invention, the vinyl acetate content thereof is required to fall in the range of from 5 to 35% by weight. Of various propylene polymers, atactic polypropylene is particularly desirable. These olefinic polymers are used either alone or in the form of a mixture of two or more members.

For the purpose of this invention, any block copolymer can be used without reference to its construction insofar as it is produced by the ordinary solution polymerization process using an alkyl lithium as its catalyst. Similarly, the modified vinyl-aromatic resin can be of any type insofar as it is made by the ordinary polymerization process.

In this invention, there are used two types of block copolymers which are elastomeric block copolymers containing styrene in an amount of from 10 to 50% by weight and resinous block copolymers containing styrene in an amount of from 50 to 95% by weight. The former copolymers are used in an amount of not more than 50% by weight and the latter copolymers in an amount of not more than 70% by weight. When the former copolymers are used in an amount exceeding 50% by weight, the tackiness of blend increases, so that the film forming becomes difficult. When the latter copolymers are used in an amount exceeding the upper limit mentioned above, the film of easy seal pealing can not be obtained. Further in the present invention, the vinyl-aromatic resin and/or modified vinyl-aromatic resin are used in an amount of not more than 90% by weight. When the amount exceeds 90% by weight, the seal conditions which give desirable easy seal peeling are not obtained any longer. The amount of the olefinic copolymer is in the range of from 2.5 to 50% by weight, no matter what composition ratio may be involved. When this amount is less than 2.5% by weight, the conditions which give good seal peeling cannot easily be obtained. When it exceeds 50% by weight, the self-tackiness of film increases so high that the film forming becomes difficult.

In this invention, the film is obtained by blending the components in a mixing device such as Henshel mixer or tumbler mixer and directly extruding the resulting blend through an extruder, or the film may be produced by extruding the mix into pellets through an extruder and subsequently melting and extruding the pellets into a film. The film forming can be effected by any one of the known methods such as inflation process, T-die process, casting process and calender process. Normally, the inflation process is used.

In the present invention, the film obtained as described above may be used in its single form as the cover for plastic container. A still better cover for the plastic container may be obtained by using this film as a substrate and superposing some other plastic film, metal foil or paper thereon and thereby producing a laminate. Examples of such other plastic films which are used for this lamination include oriented polystyrene film, oriented polyethylene terephthalate film, oriented polypropylene film, polyamide film, oriented polyamide film, cellophane and the like. Further, these films may be used in a form having aluminum or other inorganic compound such as silica vacuum deposited on the surfaces. As the metallic foil, there is generally used aluminum foil.

The laminate is obtained by any one of ordinary methods employed for the purpose of lamination such as extrusion lamination, dry lamination and wet lamination. Examples of adhesive which are used in the dry lamination include solvent type adhesive using vinyl acetate and vinyl chloride, adhesive containing celluloses such as nitrocellulose, ethyl cellulose and acetyl cellulose, and reactive adhesive using polyurethane. Examples of adhesive usable in the wet lamination include adhesive using proteinaceous substances such as casein and gelatin, adhesive using vinyl chloride-vinyl acetate and vinyl acetate-acrylic acid copolymers, acrylic ester copolymer emulsions and vinyl acetate emulsions. In the extrusion lamination, polyolefinic resins and their copolymer resins may be used. The laminate of this invention can otherwise be obtained by extrusion coating the aforementioned plastic film, paper or metallic foil with the resinous composition which would be used in the making of the film according to the present invention.

The laminate obtained as described above is applied by heat sealing to containers made of plastic materials such as polystyrene, polyolefins, polyvinyl chloride, polycarbonate, polyamide, and thermoplastic polyesters. The heat sealing can be carried out by any one of known methods such as bar sealing, impulse sealing and hot-plate sealing. In addition, high-frequency sealing, ultrasonic sealing and induction sealing are also used for this purpose.

The heat sealing temperature is variable with the particular material of containers involved, other heat sealing conditions such as pressure and time and the shape of sealing head. When the heat sealing is carried out by using the ordinary hot plate type heat sealer, the heat sealing temperature is in the range of from about 100° to about 200° C. Peel strength is used as the criterion for the easy seal peeling of the container which has been sealed as described above. Generally, easy seal peeling is obtained when the peel strength is in the range of from 0.3 to 1.5 kg/20 mm. Fairly easy seal peeling may be obtained even at the peel strength exceeding 1.5 kg/20 mm depending on the laminate incorporating the rigid substrate or the material of the container subjected to heat sealing.

As to materials suitable for the plastic containers, in case of polystyrene containers there are used styrene polymers, impact-resistant styrene polymers, styrene-butadiene block copolymers, mixtures thereof, styrene-methyl methacrylate-butadiene copolymers, styrene-acrylonitrile copolymers, styrene-acrylonitrile-butadiene copolymers and other styrene copolymers. Plastic containers are obtained by subjecting sheets made of the aforementioned materials to heat molding, and by injection molding or injection-blow molding. Polyolefin containers which are used for the present invention include those made of low-density polyethylene, high-density polyethylene, polypropylene and their copolymers. Further, paper containers or metallic containers having their surfaces coated with the aforementioned plastic materials can also be used for the purpose of heat sealing of the present invention.

As described above, the film and the laminate produced in accordance with the present invention possess excellent properties as covers for plastic containers and produce sealed containers which have easy sealing property and high seal peeling property.

EXAMPLE 1

In a Henshel mixer, a varying set of components indicated in Table 1 were blended in a varying ratio indicated in Table 1. The blend thus obtained was molded by inflation method under the conditions indicated below to form a film of 100μ in thickness. The film was tested for heat sealing property, film forming property and film property. The results are shown in Table 1.

(Molding conditions)
Extruder: 40 m/m, L/D ratio=22
Dies: Spiral, 100 mm in diameter
Blow ratio: 3.0

As to the test for heat sealing property, each of the film obtained in the varying compositions indicated in Table 1 was heat sealed to a pudding container made of an impact-resistant styrene resin. The heat sealing property was rated by the o and x scale, wherein o denotes a sealing temperature zone of at least 20° C. in which easy seal peeling is obtained and x denotes a sealing temperature of less than 20° C. respectively. The film forming property was rated by the o and x scale, wherein o denotes a composition capable of forming a film by the inflation process and x denotes a composition incapable of forming a film.

The heat sealing was carried out by use of a cup sealer under 5 to 10 kg/cm² of pressure for 1.6 seconds of sealing time.

TABLE 1

| Test Run No. | Olefinic polymer | SB elastomer | SB resin | Poly-styrene | HI poly-styrene | Heat sealing property | Film forming property |
|---|---|---|---|---|---|---|---|
| | (EVA) | | | | | | |
| 1* | — | 60 | — | — | 40 | x | x |
| 2 | 5 | 30 | — | — | 65 | o | o |
| 3 | 20 | 30 | — | — | 50 | o | o |
| 4 | 40 | 30 | — | — | 30 | o | o |
| 5 | 20 | — | — | — | 80 | o | o |
| 6 | 20 | 10 | 20 | — | 50 | o | o |
| 7 | 20 | 15 | 20 | — | 45 | o | o |
| 8 | 50 | 50 | — | — | — | o | o |
| 9 | 20 | 10 | 50 | — | 20 | o | o |
| 10 | 30 | 20 | 30 | — | 20 | o | o |
| 11 | 40 | 20 | 30 | — | 10 | o | o |
| 12* | — | 20 | 60 | — | 20 | x | o |
| 13 | 30 | — | 50 | — | 20 | o | o |
| 14 | 30 | 20 | 50 | — | — | o | o |
| | (EEA) | | | | | | |
| 15 | 10 | — | 90 | — | — | o | o |
| 16 | 20 | — | 80 | — | — | o | o |
| 17 | 40 | — | 60 | — | — | o | o |
| 18* | — | 60 | — | — | 40 | — | x |
| 19 | 5 | 30 | — | — | 65 | o | o |
| 20 | 20 | 30 | — | — | 50 | o | o |
| 21 | 40 | 30 | — | — | 30 | o | o |
| 22 | 20 | — | — | — | 80 | o | o |
| 23 | 20 | 10 | — | 20 | 50 | o | o |
| 24 | 20 | 15 | — | 20 | 45 | o | o |
| 25 | 50 | 50 | — | — | — | o | o |
| 26 | 20 | 50 | 10 | — | 20 | o | o |
| 27 | 30 | 30 | 20 | — | 20 | o | o |
| 28 | 40 | 30 | 20 | — | 10 | o | o |
| 29* | — | 60 | 20 | — | 20 | x | o |
| 30 | 30 | 50 | — | — | 20 | o | o |
| 31 | 30 | 50 | 20 | — | — | o | o |
| | (Tafmer) | | | | | | |
| 32 | 3 | — | 97 | — | — | o | o |
| 33 | 15 | — | 85 | — | — | o | o |
| 34 | 30 | — | 70 | — | — | o | o |
| 35 | 45 | — | 55 | — | — | o | o |
| 36 | 30 | — | 70 | — | — | o | o |
| 37 | 3 | 40 | 57 | — | — | o | o |
| 38 | 20 | 20 | 60 | — | — | o | o |
| 39 | 40 | 30 | 30 | — | — | o | o |
| 40 | 5 | 5 | 90 | — | — | o | o |
| 41 | 20 | 60 | 20 | — | — | o | o |
| 42 | 30 | 20 | 50 | — | — | o | o |
| 43* | — | 60 | — | — | 40 | x | x |
| 44 | 5 | 30 | — | — | 65 | o | o |
| 45 | 20 | 30 | — | — | 50 | o | o |
| 46 | 40 | 30 | — | — | 30 | o | o |
| 47 | 20 | — | — | — | 80 | o | o |
| 48 | 20 | 10 | — | 20 | 50 | o | o |
| 49 | 20 | 15 | — | 20 | 45 | o | o |
| 50 | 50 | 50 | — | — | — | o | o |
| 51 | 20 | 10 | 50 | — | 20 | o | o |
| 52 | 30 | 20 | 30 | — | 20 | o | o |
| 53 | 40 | 20 | 30 | — | 10 | o | o |
| 54* | — | 20 | 60 | — | 20 | x | o |
| 55 | 30 | — | 50 | — | 20 | o | o |
| 56 | 30 | 20 | 50 | — | — | o | o |

*Comparative example
(Note) (1) EVA: Ethylene-vinyl acetate copolymer ("Evaflex P-1905", made by Mitsui Polychemical, vinyl acetate content 19% by weight)
(2) EEA: Ethylene-ethyl acrylate copolymer ("EEA Copolymer-DPDJ 6169", made by Nippon Unicar, ethyl acrylate content 18% by weight)
(3) Tafmer: Ethylene-butene (1) random copolymer ("Tafmer-A 4085", made by Mitsui Petrochemical, butene (1) content 21% by weight)
(4) SB elastomer: Styrene-butadiene block copolymer ("Tufprene", made by Asahi Chemical, styrene content 40% by weight)
(5) SB resin: Styrene-butadiene block copolymer ("Denka Clearene", made by Denki Kagaku, styrene content 80% by weight)
(6) Polystyrene: Styrene polymer ("Denka Styrol GP", made by Denki Kagaku)
(7) HI-polystyrene: Rubber-modified impact-resistant styrene polymer ("Denka Styrol HIE-4", made by Denki Kagaku)

EXAMPLE 2

In a Henshel mixer, a varying set of components indicated in Table 2 were blended in a varying ratio indicated in Table 2. The resulting blend was converted into pellets by an extruder. The pellets were extruded into a film of 100μ in thickness by an extruder operated by the inflation process under the same conditions as in Example 1. This film was bonded by heat sealing to a polystyrene sheet 1 mm in thickness and to a laminate of a polyethylene film superposed on a polystyrene sheet under the same sealing conditions as in Example 1 and then tested for peel strength along the sealed portion. The results are shown in Table 2.

TABLE 2

| Test Run No. | Film composition (%) by wt. | | | | | Material of sheet | Peel strength (Kg/20 mm) | | | | |
|---|---|---|---|---|---|---|---|---|---|---|---|
| | Olefinic polymer | SB elastomer | SB resin | Poly-styrene | HI poly-styrene | | 120° C. | 140° C. | 160° C. | 180° C. | 200° C. |
| | (EEA) | | | | | | | | | | |
| 1 | 30 | 40 | 10 | — | 20 | HI polystyrene | — | — | 0.7 | 0.8 | 1.0 |
| 2 | 30 | 40 | 10 | — | 20 | SB resin | — | — | 0.8 | 0.9 | 1.2 |
| 3 | 30 | 10 | 40 | — | 20 | Polyethyrene | 0.8 | — | 1.2 | 1.6 | — |
| 4 | 35 | 10 | 35 | — | 20 | Polyethyrene | 0.9 | — | 1.4 | 1.8 | — |
| | (EVA) | | | | | | | | | | |
| 5 | 30 | 10 | 40 | — | 20 | HI polystyrene | — | 0.7 | 1.1 | — | 1.4 |
| 6 | 30 | 10 | 40 | — | 20 | General purpose polystyrene | — | 0.5 | 1.2 | — | 1.4 |
| 7 | 30 | 10 | 40 | — | 20 | HI polystyrene | — | 0.7 | — | 1.0 | 1.2 |
| 8 | 30 | 10 | 40 | — | 20 | General purpose polystyrene | — | 0.5 | 1.2 | 1.4 | — |
| 9 | 30 | 10 | 40 | — | 20 | Styrene-MMA-Butadiene | — | — | 0.5 | 0.9 | 1.1 |

TABLE 2-continued

| Test Run No. | Film composition (%) by wt. | | | | | Material of sheet | Peel strength (Kg/20 mm) | | | | |
|---|---|---|---|---|---|---|---|---|---|---|---|
| | Olefinic polymer | SB elastomer | SB resin | Poly-styrene | HI poly-styrene | | 120° C. | 140° C. | 160° C. | 180° C. | 200° C. |
| | | | | | | copolymer | | | | | |
| 10 | 30 | 19 | 40 | — | 20 | Polyethyrene | 0.9 | — | 1.5 | 1.8 | — |
| 11 | 10 | 10 | 60 | — | 20 | Polyethyrene | 0.1 | — | 0.4 | 0.5 | — |
| 12 | 20 | 10 | 50 | — | 20 | Polyethyrene | 0.1 | — | 0.6 | 0.5 | — |
| 13 | 30 | 10 | 40 | — | 20 | Polyethyrene | 0.9 | — | 1.2 | 1.3 | — |
| 14 | 25 | 10 | 45 | — | 20 | Polyethyrene | 0.3 | — | 0.9 | 1.0 | — |
| 15 | 35 | 10 | 35 | — | 20 | Polyethyrene | 0.8 | — | 1.2 | 1.3 | — |
| 16 | 25 | 10 | 45 | — | 20 | Polyethyrene | 0.1 | — | 0.8 | 0.9 | — |
| 17 | 35 (Tafmer) | 10 | 35 | — | 20 | Polyethyrene | 0.3 | — | 1.0 | 1.0 | — |
| 18 | 3 | — | 97 | — | — | HI polystyrene | 0.7 | 1.2 | 1.5 | — | — |
| 19 | 15 | — | 85 | — | — | HI polystyrene | 0.5 | 0.7 | 0.9 | 1.0 | — |
| 20 | 30 | — | 70 | — | — | HI polystyrene | 0.4 | 0.6 | 0.8 | 0.9 | — |
| 21 | 45 | — | 55 | — | — | HI polystyrene | 0.3 | 0.4 | 0.6 | 0.7 | — |
| 22 | 20 | 10 | — | 20 | 50 | HI polystyrene | 0.4 | 1.3 | 1.5 | 1.5 | — |
| 23 | 20 | 15 | — | 20 | 45 | HI polystyrene | 0.3 | 0.8 | 1.2 | 1.5 | — |
| 24 | 25 | 10 | 45 | — | 20 | Polyethyrene | 1.4 | — | 1.6 | 2.0 | — |
| 25 | 15 | 10 | 55 | — | 20 | Polyethyrene | 1.2 | — | 1.5 | 1.6 | — |
| 26 | 35 | 10 | 35 | — | 20 | Polyethyrene | 1.4 | — | 1.7 | Breakage | — |
| 27 | 45 | 10 | 25 | — | 20 | Polyethyrene | 1.9 | — | 2.2 | Breakage | — |
| 28 | 20 | 10 | — | 20 | 50 | Polyethyrene | — | 0.1 | — | 0.4 | 0.5 |
| 29 | 20 | 15 | — | 20 | 45 | Polyethyrene | — | 0.1 | — | 0.5 | 0.6 |

Note 1: The values of peel strength indicated are those obtained by peeling the seal of a given sample at an angle of 180° at a speed of 200 mm/min.
Note 2: The vinyl acetate content was 19% by weight in the blends of Run Nos. 5, 6, 12 and 13, 8% by weight in those of Run Nos. 10 and 11, 25% by weight in those of Run Nos. 14 and 15 and 28% by weight in those of Run Nos. 7, 8, 16 and 17 respectively.

EXAMPLE 3

In a Henshel mixer, 40% by weight of ethylene-butene (1) random copolymer ("Tafmer-A-4085", made by Mitsui Chemical), 30% by weight of styrene-butadiene block copolymer ("Denka Clearene", made by Denki Kagaku, styrene content 80% by weight), 10% by weight of styrene-butadiene block copolymer ("Tafprene", made by Asahi Chemical, styrene content 40% by weight) and 20% by weight of an impact-resistant polystyrene resin ("Denka Styrol HI-E-4", made by Denki Kagaku) were homogeneously blended. The resulting blend was extruded by the inflation process under the same conditions as in Example 1 to obtain a film (A) of 50μ in thickness. Separately, a film (B) was produced from a blend composed of 40% by weight of ethylene-vinyl acetate copolymer ("Evaflex 1905," made by Mitsui Polychemical, vinyl acetate content 19% by weight), 30% by weight of styrene-butadiene block copolymer (styrene content 80% by weight), 10% by weight of styrene-butadiene block copolymer (styrene content 40% by weight) and 20% by weight of an impact-resistant polystyrene resin. Various other films were superposed one each on the substrates of A and B films by dry lamination using a urethane adhesive to produce laminates. These laminates were joined by heat sealing one each to pudding containers of an impact-resistant polystyrene resin at 160° C. under the sealing conditions of Example 1. The laminates on the containers were tested for various properties. The results are shown in Table 3.

TABLE 3

| | Laminate construction | Seal peeling property | Sealing property | Adaptability to packing machine | Printability | Fold retaining property | Light barrier property | Barrier property |
|---|---|---|---|---|---|---|---|---|
| 1. | OPP (30)/Seal film A (50) | o | o | o | o | — | — | — |
| 2. | PET (12)/Seal film A (50) | o | o | o | o | — | — | — |
| 3. | OPP (30)/aluminum (10)/Seal film A (50) | o | o | o | o | o | o | o |
| 4. | Paper (40)/aluminum (10)/ Seal film A (50) | o | o | o | o | o | o | o |
| 5. | Aluminum foil (20)/Seal film A (50) | o | o | o | o | o | o | o |
| 6. | PET (12)/paper (50)/Seal film A (50) | o | o | o | o | o | o | — |
| 7. | PET (12)/Seal film B (50) | o | o | o | o | — | — | — |
| 8. | OPP (30)/aluminum (10)/Seal film B (50) | o | o | o | o | o | o | o |
| 9. | PET having aluminum vacuum deposited (12)/Seal film B | o | o | o | o | — | o | o |

TABLE 3-continued

| Laminate construction | Seal peeling property | Sealing property | Adaptability to packing machine | Printability | Fold retaining property | Light barrier property | Barrier property |
| --- | --- | --- | --- | --- | --- | --- | --- |
| (100) | | | | | | | |

The numerals in parentheses indicate film thicknesses in $\mu$.
(Note)
(1) OPP: Oriented polypropylene resin
(2) PET: Oriented polyethylene terephthalate resin
(3) Sealing property: Sealed cups using a given laminate and filled with water were dropped from a height of 50 cm onto a concrete floor and examined for water leakage. When more than 50% by the cups passed the test, the laminate was rated as acceptable (o).
(4) Light barrier property: Total light transmittance (%) (ASTM-D-1003-61). When a given sample gave 0%, it was rated as acceptable (o).
(5) Barrier property: Oxygen transmission rate (ASTM-D-1434-66: in $cc/m^2$ . 24 hours . atm.) When a given sample gave Occ, it was rated as acceptable (o).
(6) Adaptability to packaging machine: The heating base was examined for presence or absence of blocking, and the laminate was examined for wrinkle and warp per heat sealing. When a given sample was found to be free from these defects, it was rated as acceptable (o).
(7) Printability: Adaptability to the printing machine. When a given sample was passed through the machine without uneven coloring and zigzagging, it was rated as acceptable (o).
(8) Fold retaining property: When a given sample was bent under a load of 1 kg and, after removal of the load, was kept in a form folded by an angle of less than 45°, it was rated as acceptable (o).

EXAMPLE 4

On the seal film B obtained in Example 3, an aluminum foil of 25 microns in thickness was supperposed by the extrusion lamination process to obtain a laminate. This laminate exhibited properties which all satisfied the standards indicated in Example 3.

What is claimed is:
1. A laminate comprising:
   (a) a first substrate comprising at least one member selected from the group consisting of plastic films, metallic foils and paper;
   (b) a second substrate comprising a film for heat sealing which comprises a blend of:
      (I) at least one member selected from the group consisting of (A) an elastomeric block copolymer containing 10 to 50% by weight of styrene and/or alpha-methyl styrene copolymerized with conjugated dienes, (B) a resinous block copolymer containing 50 to 95% by weight of styrene and/or alpha-methyl styrene copolymerized with conjugated dienes;
      (II) a styrene-butadiene graft-copolymer, and
      (III) at least one member selected from the group consisting of ethylene-alpha-olefin random copolymers, ethylene-vinyl acetate copolymers, ethylene-alkyl acrylate copolymers, polypropylene and ethylene-propylene elastomers; and
   (c) an adhesive for bonding therebetween.
2. The laminate of claim 1, wherein the first substrate is composed of the paper and the metallic foil.
3. The laminate of claim 1, wherein the first substrate is composed of the plastic film and the metallic foil.
4. The laminate of claim 1, wherein the first substrate is composed of the plastic film and the paper.
5. The laminate of claim 1, wherein the first substrate is composed of the plastic film, the paper and the metallic foil.
6. The laminate of claim 1, wherein the plastic film is selected from the group consisting of oriented polystyrene film, oriented polyethylene terephthalate film, oriented polypropylene film, polyamide film, oriented polyamide film and cellophane.
7. The laminate of claim 1, wherein the metallic foil is aluminium foil.
8. The laminate of claim 1, wherein the plastic film is obtained by vacuum-metallizing a metal on a plastic film.
9. The laminate of claim 1, wherein the plastic film is obtained by vacuum evaporation of an inorganic compound on a plastic film.
10. The laminate of claim 8, wherein the metal used for the metallization is aluminum.
11. The laminate of claim 9, wherein the inorganic compound is silica.

* * * * *